United States Patent [19]
Young

[11] Patent Number: 5,505,027
[45] Date of Patent: Apr. 9, 1996

[54] SERVICE CONDUIT DRAIN

[76] Inventor: James E. Young, 1265 Thiel Rd., Hayward, Calif. 94544

[21] Appl. No.: 415,315

[22] Filed: Apr. 3, 1995

[51] Int. Cl.$^6$ .............................. E02D 31/00; H02G 3/00
[52] U.S. Cl. .................... 52/169.5; 52/741.3; 138/37; 137/1; 405/52; 405/303
[58] Field of Search ................ 52/169.5, 302.1, 52/741.3; 137/1, 590.5; 138/37; 285/14, 132; 405/52, 303

[56] References Cited

U.S. PATENT DOCUMENTS

| | | | |
|---|---|---|---|
| 648,317 | 4/1900 | Waters | 137/590.5 |
| 976,593 | 11/1910 | Newsome | 138/37 X |
| 1,144,306 | 6/1915 | Mock | 138/37 X |
| 1,826,322 | 10/1931 | Mueller | 138/37 X |
| 4,998,754 | 3/1991 | Matsumoto et al. | 285/132 X |

FOREIGN PATENT DOCUMENTS 0618450  2/1949  United Kingdom ............. 138/37

Primary Examiner—Robert J. Canfield
Attorney, Agent, or Firm—Linval B. Castle

[57] ABSTRACT

In hilly areas, building below the level of flooded manholes or secondary distribution boxes are often damaged by water entering the electric meter enclosure through the service conduit. For eliminating drain water from a service conduit before it reaches a meter enclosure, a drain pipe is installed in the conduit below the meter enclosure. The drain pipe must not be accessible to any probing and therefore has several spaced, oppositely and alternately positioned vanes in the bore with each vane covering over half the area of the bore.

4 Claims, 1 Drawing Sheet

SERVICE CONDUIT DRAIN

BRIEF SUMMARY OF THE INVENTION

This invention relates to electrical installation and in particular to a safety drain for a flooded underground entrance service conduit.

Utility companies and usually building codes insist that electrical power conductors are brought to the meter enclosure of a building through a solid conduit and that the meter be sealed in a metal enclosure to prevent accidental human contact with the power conductors. The conductors then extend from the meter enclosure into the building to a circuit breaker enclosure.

A serious problem occasionally arises in the underground electric distribution to buildings constructed in hilly areas at elevations below that of the underground manhole or distribution box. It is water damage to the building as a result of temporary flooding of the distribution box.

Electric meters are located on, or are accessible to the exterior of a building at an elevation of between 48 to 75 inches above ground level of the building. If supplied by a modern underground electric distribution conduit, and if the building has been built on the side of a hill and over six feet below the level of the utility's distribution box, flooding of the box will fill the conduit to the building with water. Regardless of any sealing material applied to the end of the conduit, this water will seep into the building circuit breaker enclosure and could damage the interior walls of the building.

The danger of such damage could be completely eliminated if any water in the distribution conduit could be drained before it meets the meter enclosure. But drilling a hole in the conduit and the installation a drain pipe would enable the curious child to probe into the drain pipe with the possibility of disastrous results.

The invention described herein is for a drain pipe which, when coupled to a flooded distribution conduit below the meter enclosure, will permit water to be drained from the conduit and cannot be entered by a probe.

Briefly described the drain pipe comprises a tubular member having at least two spaced, oppositely disposed deflecting vanes in the bore, each vane occupying over half the area of the bore.

BRIEF DESCRIPTION OF THE DRAWINGS

In the drawings which illustrate the preferred embodiment of the invention.

DETAILED DESCRIPTION

Figure 1:
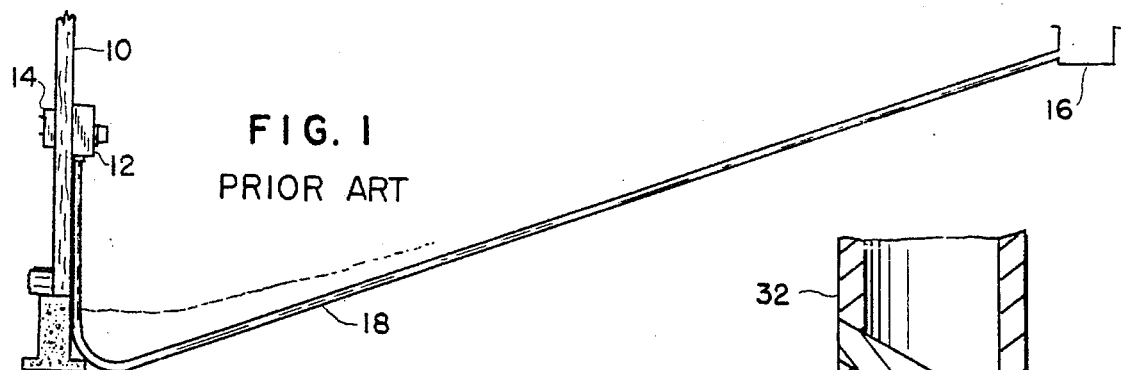
FIG. 1 is a view of prior art that illustrates the problem of flooding.

FIG. 1 illustrates a condition which can lead to a damages interior to a building. In FIG. 1, a building 10 with a meter enclosure 12 at an exterior wall and a circuit breaker panel 14 opposite the meter enclosure on the interior wall. Assume the meter enclosure 12 is located six feet above ground level which is at an elevation below that of a utility manhole or secondary distribution box 16 at street level. A distribution conduit 18 connects the distribution box 16 with the meter in enclosure 12.

If the distribution box 16 becomes flooded with water it will run downhill within the conduit 18. Attempts have been made to seal the conduit by the application of a rubber sealant at the entry into the meter enclosure; however, such seals eventually leak so that the water will enter the meter enclosure and the circuit breaker panel 14 to cause damage to the interior wall of the building 10.

Figure 2:
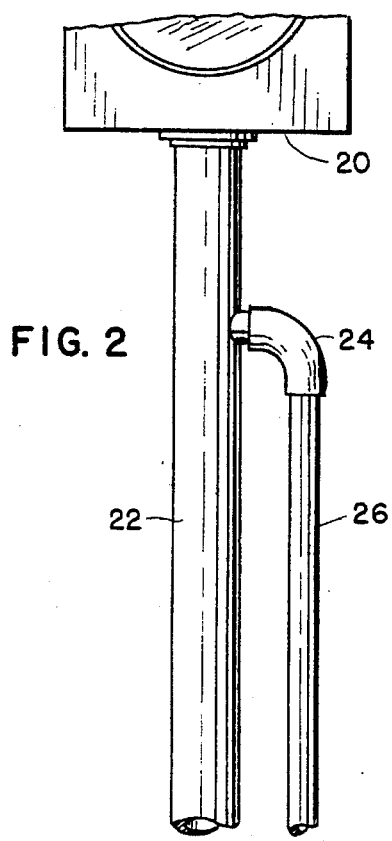
FIG. 2 is an elevational view of a portion of an incoming distribution conduit with drain pipe.

FIG. 2 is an elevational view showing a portion of a meter enclosure 20 with a service conduit 22 entering from below. Conduit 22 will have a diameter of 2 to 4 inches for the normal residential service. Entering the conduit through an elbow 24, about one foot below the enclosure 20, is the special drain pipe 26 of the invention. In modern buildings where the conduit is located within the walls, the drain pipe 26 may be of one inch Schedule 40 plastic. It must also be located within the walls with the lower end of the pipe coupled to a drain outside of the building footing or piped away to a drainage system. The end should be covered with a screen to prevent the entry of garden insects.

Figure 3:
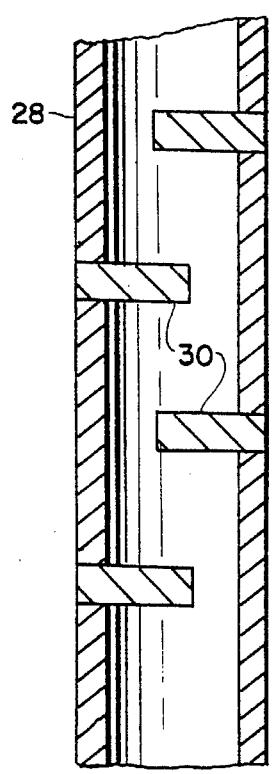
FIG. 3 is a sectional view of the drain pipe of the invention.

FIG. 3 is a sectional view of one embodiment of the special drain pipe of FIG. 2. Drain pipe 28, which need be only about one foot in length, is illustrated with four deflecting vanes 30 in the bore of the pipe. Each vane extends past the centerline of the bore and therefore covers over half the area of the bore. The vanes 30 are preferably installed by milling slots in the wall of the pipe and cementing in the vanes, followed by smooth grinding the exterior and, if metal, galvanizing both the exterior and interior.

The deflecting vanes 30 are staggered in the pipe 28 with oppositely and alternately disposed vanes separated by about two inches. Water that has flooded a conduit and flowed into the drain pipe 28 is therefore not impeded in its flow past four vanes in a drain pipe, but the vanes will stop the insertion of any probing stick or wire.

Figure 4:
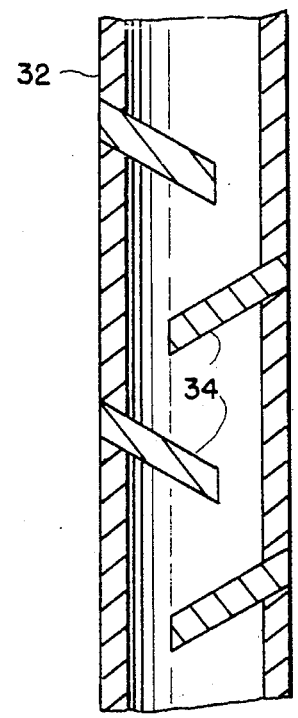
FIG. 4 is a sectional view of an alternate embodiment of the drain pipe.
Figure 5:
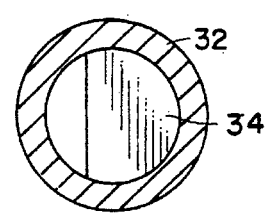
FIG. 5 is an end view through FIG. 4.

FIG. 4 is a sectional view of a preferred embodiment of the special drain pipe 32 with deflecting vanes 34 installed at a downward sloping acute angle of approximately 30° in the bore of the pipe. Vanes 32 cover over half the area of the bore as shown in FIG. 5. With the vanes thus sloped downward, only two vanes are needed in a pipe to prevent entrance of a probe because any probe entering from the bottom would be forced against a side of the pipe. The disadvantage of this embodiment is that it is polarized and the drain water must flow in only one direction.

What is claimed is:

1. A method for preventing water in a flooded electric distribution box from flowing from said box through an electric service conduit and entering a meter enclosure of a building located at an elevation lower than said box, said method comprising the step of:

connecting a drain pipe to the electric service conduit at a point below its entry into the meter enclosure, said drain pipe having in its bore a plurality of spaced, oppositely and alternately disposed deflecting vanes, each vane of said plurality contacting at least half the internal wall of said bore and each vane covering over half the area of said bore.

2. A drain assembly comprising in combination a drain pipe, electric service conduit, and meter enclosure for preventing water in a flooded electric distribution box from flowing from said box through an electric service conduit and entering a meter enclosure at an elevation lower than said box, said drain pipe being being connected to said service conduit below said meter enclosure, said drain pipe resistant to probes and having a plurality of spaced, oppositely and alternately disposed deflecting vanes, each vane of said plurality contacting at least half the internal wall of said bore and each vane covering over half the area of said bore.

3. The drain assembly claimed in claim 2, wherein said plurality of deflecting vanes extend into the bore of said pipe at right angles to the longitudinal axis of said pipe.

4. The drain assembly claimed in claim 2, wherein said said plurality of deflecting vanes extend into the bore of said pipe at an acute angle to the longitudinal axis of said pipe.

* * * * *